US009161260B2

(12) United States Patent
Seok (10) Patent No.: US 9,161,260 B2
(45) Date of Patent: Oct. 13, 2015

(54) METHOD AND APPARATUS FOR SPACE DIVISION MULTIPLE ACCESS FOR WIRELESS LOCAL AREA NETWORK SYSTEM

(71) Applicant: LG ELECTRONICS INC., Seoul (KR)

(72) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/174,649

(22) Filed: Feb. 6, 2014

(65) Prior Publication Data

US 2014/0177616 A1   Jun. 26, 2014

Related U.S. Application Data

(63) Continuation of application No. 13/321,531, filed as application No. PCT/KR2010/003196 on May 20, 2010, now Pat. No. 8,681,793.

(60) Provisional application No. 61/180,443, filed on May 22, 2009.

(51) Int. Cl.
| | |
|---|---|
| *H04W 4/00* | (2009.01) |
| *H04W 28/02* | (2009.01) |
| *H04W 72/04* | (2009.01) |
| *H04W 74/00* | (2009.01) |

(52) U.S. Cl.
CPC ........ *H04W 28/0236* (2013.01); *H04W 72/046* (2013.01); *H04W 74/004* (2013.01)

(58) Field of Classification Search
CPC .......... H04W 72/046; H04W 72/0426; H04W 74/004; H04W 72/005; H04W 72/02; H04W 72/04; H04W 72/0413; H04W 72/0433; H04W 28/0236

USPC .................. 370/329, 392, 338, 347, 442–509
See application file for complete search history.

(56) References Cited

U.S. PATENT DOCUMENTS

| | | | |
|---|---|---|---|
| 8,089,925 | B1 | 1/2012 | Uhlik et al. |
| 8,098,667 | B2 | 1/2012 | Julian et al. |
| 2003/0133426 | A1 | 7/2003 | Schein et al. |
| 2005/0141459 | A1* | 6/2005 | Li et al. ......................... 370/334 |
| 2005/0221869 | A1* | 10/2005 | Liu et al. ........................ 455/574 |
| 2005/0245269 | A1* | 11/2005 | Demirhan et al. ......... 455/452.1 |
| 2007/0191043 | A1* | 8/2007 | Shapira et al. ............... 455/522 |
| 2008/0102852 | A1* | 5/2008 | Du et al. ....................... 455/453 |
| 2008/0123577 | A1* | 5/2008 | Jaakkola et al. ............. 370/311 |
| 2009/0201871 | A1 | 8/2009 | Sambhwani et al. |
| 2009/0268653 | A1* | 10/2009 | Itagaki et al. ................ 370/311 |
| 2010/0008318 | A1 | 1/2010 | Wentink et al. |

(Continued)

OTHER PUBLICATIONS

Chen, "Medium Access Control of Wireless LANs for Mobile Computing," IEEE Network, Sep./Oct. 1994, pp. 50-63.

(Continued)

*Primary Examiner* — Afsar M Qureshi
(74) *Attorney, Agent, or Firm* — Lee, Hong, Degerman, Kang & Waimey (57) ABSTRACT

A space division multiple access (SDMA) method is provided. The method may be performed by a station (STA), in a wireless local area network (WLAN) system. The method includes overhearing a third transmission response message transmitted by an access point (AP), and determining whether to access a channel on the basis of criteria information included in the third transmission response message.

6 Claims, 5 Drawing Sheets

(56) References Cited

U.S. PATENT DOCUMENTS

| | | | |
|---|---|---|---|
| 2010/0142423 A1* | 6/2010 | Zhu et al. | 370/311 |
| 2010/0220679 A1* | 9/2010 | Abraham et al. | 370/329 |
| 2012/0188973 A1 | 7/2012 | Meylan et al. | |
| 2013/0064236 A1* | 3/2013 | Ji et al. | 370/338 |
| 2013/0121293 A1 | 5/2013 | Surineni et al. | |

OTHER PUBLICATIONS

R. Jurdak et al., "A Survey, Classification and Comparative Analysis of Medium Access Control Protocols for Ad Hoc Networks," IEEE Communications Surveys & Tutorials, First Quarter, vol. 6, No. 1, Dec. 2004.

* cited by examiner

METHOD AND APPARATUS FOR SPACE DIVISION MULTIPLE ACCESS FOR WIRELESS LOCAL AREA NETWORK SYSTEM

This application is a continuation of U.S. application Ser. No. 13/321,531, filed on Nov. 18, 2011, now U.S. Pat. No. 8,681,793, which is the National Stage filing under 35 U.S.C. 371 of International Application No. PCT/KR2010/003196, filed on May 20, 2010, which claims the benefit of U.S. Provisional Application Ser. No. 61/180,443, filed on May 22, 2009, the contents of which are incorporated by reference herein in their entirety.

BACKGROUND OF THE INVENTION

1. Field of the Invention

The present invention relates to wireless communications, and more particularly, to a method of space division multiple access (SDMA) in a wireless local area network (WLAN) system and an apparatus for supporting the method.

2. Discussion of the Background Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to 540 Mbps or higher, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of above 1 Gbps. This is because the IEEE 802.11n MAC/PHY protocol is designed for an operation of a station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of above 1 Gbps in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of above 1 Gbps in a MAC service access point (SAP).

The VHT WLAN system allows simultaneous channel access of a plurality of VHT STAs for the effective use of a radio channel. For this, a multi-user multiple input multiple output (MU-MIMO)-based transmission using multiple antennas is supported. The VHT AP can perform spatial division multiple access (SDMA) transmission for transmitting spatially multiplexed data to the plurality of VHT STAs.

SUMMARY OF THE INVENTION

The present invention provides a space division multiple access (SDMA) method capable of optimizing resource utilization of a wireless medium in a wireless local area network (WLAN) system.

The present invention also provides a wireless communication apparatus supporting an SDMA method capable of optimizing resource utilization of a wireless medium in a WLAN system.

In an aspect, a space division multiple access (SDMA) method, performed by a station (STA), in a wireless local area network (WLAN) system is provided. The method includes overhearing a third transmission response message transmitted by an access point (AP), and determining whether to access a channel on the basis of criteria information included in the third transmission response message.

The third transmission response message may be a response for a third transmission request message transmitted by a third STA to the AP, and The criteria information may be channel state information acquired by the AP by estimating the channel on the basis of the third transmission request message.

The determining of whether to access to the channel on the basis of the criteria information may include determining a channel correlation level of the STA and the third STA on the basis of the channel state information, and deferring channel access if the channel correlation level is higher than a specific level, and continuing channel access if the channel correlation level is lower than the specific level.

The third transmission request message may be a request to send (RTS) frame or a sounding physical layer convergence procedure (PLCP) protocol data unit (PPDU).

The third transmission response message may be a clear to send (CTS) frame.

The third transmission response message may be a response for the third transmission request message transmitted by the third STA to the AP.

The criteria information may be an access category of traffic to be transmitted by the third STA and is included in the third transmission request message received by the AP.

The determining of whether to access the channel on the basis of the criteria information may include determining whether the access category of the traffic to be transmitted by the STA is equal to an access category indicated by the criteria information, and deferring channel access if the access category of the traffic to be transmitted by the STA is different from the access category indicated by the criteria information, and continuing channel access if the access category of the traffic to be transmitted by the STA is equal to the access category indicated by the criteria information.

The third transmission response message may be a response for the third transmission request message transmitted by the third STA to the AP.

The criteria information may be permissible received power level range information determined on the basis of a received power level of the third transmission request message for the AP.

The determining of whether to access the channel on the basis of the criteria information may include determining whether the received power level of the third transmission response message for the STA falls within a received power level range indicated by the criteria information, and deferring channel access if the received power level of the third transmission response message for the STA is out of the received power level range indicated by the criteria information, and continuing channel access if the received power level of the third transmission response message for the STA falls within the received power level range indicated by the criteria information.

According to the present invention, space division multiple access (SDMA) transmission is achieved for stations (STAs) grouped on the basis of a channel correlation or a target received power level, and thus utilization efficiency of a radio resource can be improved and transmission efficiency can also be improved.

DETAILED DESCRIPTION OF THE INVENTION

Hereinafter, embodiments of the present invention will be described with reference to the accompanying drawings. The embodiments of the present invention described below can be effectively applied to a very high throughput (VHT) wireless local area network (WLAN) system supporting multi user multiple input multiple output (MU-MIMO). Although the VHT WLAN system will be described hereinafter for example, the technical features of the present invention are not limited thereto. For example, the embodiments of the present invention can be also equally applied to various wireless communication systems using a method of determining whether one or more stations (STAs) will access a channel in an adaptive manner according to a channel state.

Figure 1:
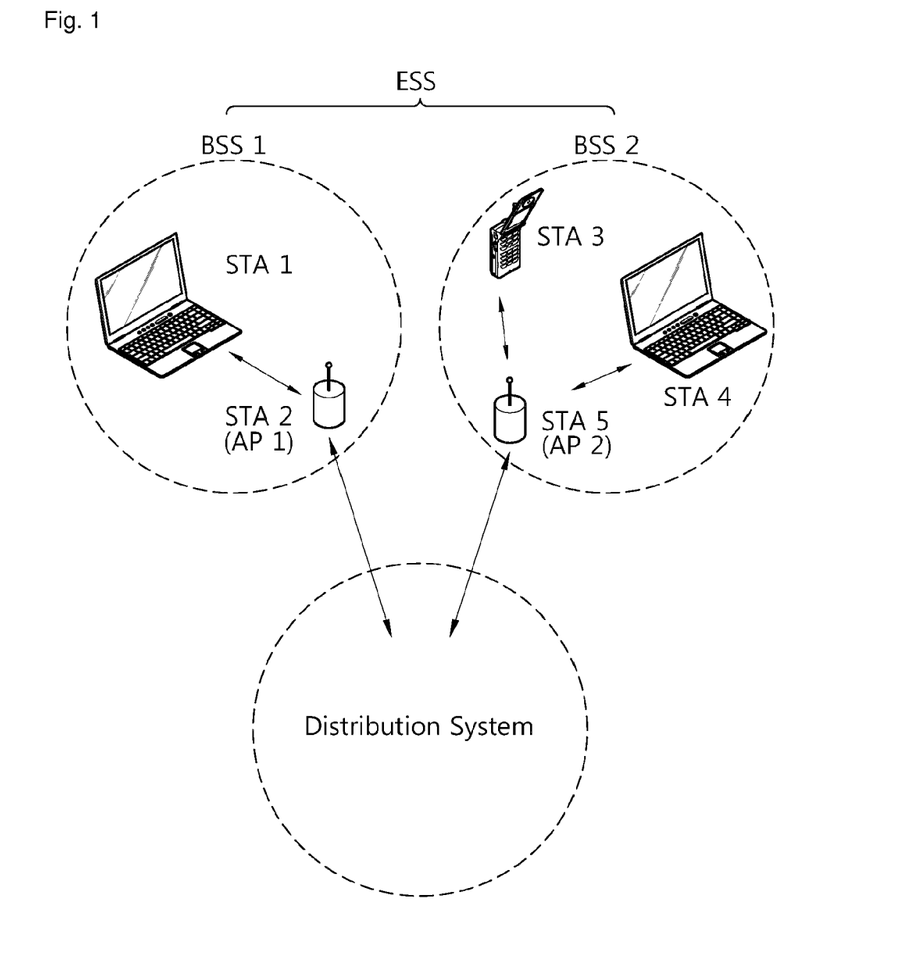
FIG. 1 is a schematic view showing an exemplary structure of a wireless local area network (WLAN) system to which an embodiment of the present invention can be applied.

FIG. 1 is a schematic view showing an exemplary structure of a WLAN system to which an embodiment of the present invention can be applied.

Referring to FIG. 1, the WLAN system includes one or more basis service sets (BSSs). The BSS is a set of stations (STAs) which are successfully synchronized to communicate with one another, and is not a concept indicating a specific region. The BSS can be classified into an infrastructure BSS and an independent BSS (IBSS). The infrastructure BSS is shown in FIG. 1. Infrastructure BSSs (i.e., BSS1 and BSS2) include one or more STAs (i.e., STA1, STA3, and STA4), access points (APs) which are STAs providing a distribution service, and a distribution system (DS) connecting a plurality of APs (i.e., AP1 and AP2). On the other hand, the IBSS does not include APs, and thus all STAs are mobile STAs. In addition, the IBSS constitutes a self-contained network since connection to the DS is not allowed.

The STA is an arbitrary functional medium including a medium access control (MAC) and wireless-medium physical layer interface conforming to the institute of electrical and electronics engineers (IEEE) 802.11 standard, and includes both an AP and a non-AP STA in a broad sense. A VHT STA is defined as an STA that supports super high-rate data processing of above 1 GHz in the multi-channel environment to be described below. In the VHT WLAN system to which the embodiment of the present invention is applicable, STAs included in the BSS may be all VHT STAs, or a VHT STA and a legacy STA (i.e., IEEE 802.11n-based HT STA) may coexist.

Among the STAs, non-AP STAs (i.e., STA1, STA3, and STA4) are portable terminals operated by users. A non-AP STA may be simply referred to as an STA. The non-AP STA may also be referred to as a wireless transmit/receive unit (WTRU), a user equipment (UE), a mobile station (MS), a mobile terminal, a mobile subscriber unit, etc. A non-AP VHT-STA (or simply a VHT STA) is defined as a non-AP STA that supports the super high-speed data processing of above 1 GHz and space division multiple access (SDMA) to be described below.

The AP (i.e., AP1 and AP2) is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. In addition to the terminology of an access point, the AP may also be referred to as a centralized controller, a base station (BS), a node-B, a base transceiver system (BTS), a site controller, etc. A VHT AP is defined as an AP that supports the super high-speed data processing of above 1 GHz and SDMA to be described below.

A plurality of infrastructure BSSs can be interconnected by the use of the DS. An extended service set (ESS) is a plurality of BSSs connected by the use of the DS. STAs included in the ESS can communicate with one another. In the same ESS, a non-AP STA can move from one BSS to another BSS while performing seamless communication.

The DS is a mechanism whereby one AP communicates with another AP. By using the DS, an AP may transmit a frame for STAs associated with a BSS managed by the AP, or transmit a frame when any one of the STAs moves to another BSS, or transmit a frame to an external network such as a wired network. The DS is not necessarily a network, and has no limitation in its format as long as a specific distribution service specified in the IEEE 802.11 can be provided. For example, the DS may be a wireless network such as a mesh network, or may be a physical structure for interconnecting APs.

Hereinafter, transmission from an AP to an STA is referred to as downlink transmission, and transmission from the STA to the AP is referred to as uplink transmission. The AP and the STA may transmit spatially multiplexed data in uplink transmission or downlink transmission through multiple antennas. Transmission of the spatially multiplexed data to a plurality of STAs is referred to as SDMA transmission. To perform SDMA transmission by allowing the plurality of STAs to simultaneously access a channel, the STAs may simultaneously perform transmission over a plurality of spatial streams by using respective multiple antennas.

When using an SDMA method in which the plurality of STAs perform uplink transmission or downlink reception with an AP by simultaneously accessing a channel, the STAs participating in transmission by simultaneously accessing the channel need to be coordinated according to a specific criterion in order to optimize utilization of a radio resource. As an example, STAs having a low channel correlation between the AP and the respective STAs participating in transmission may be grouped for the effective use when participating in transmission. This is because, when STAs having a high correlation participate in transmission simultaneously, an interference level may increase and thus a performance gain may decrease.

The present invention proposes an SDMA method for increasing a performance gain by coordinating STAs participating in transmission simultaneously according to a specific criterion.

Figure 2:
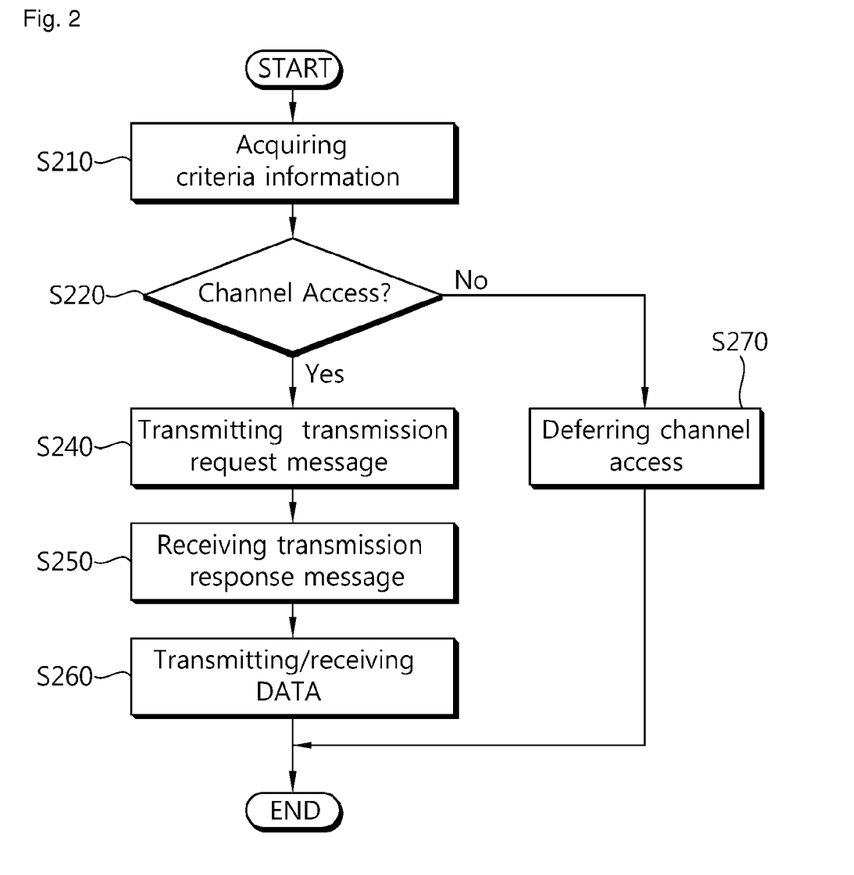
FIG. 2 is a flowchart showing a channel access method of a station (STA) according to an embodiment of the present invention.

FIG. 2 is a flowchart showing a channel access method of an STA according to an embodiment of the present invention.

The STA acquires criteria information before channel access (step S210). The criteria information is a criterion for determining whether the STA will continue or defer channel access. The STA may acquire the criteria information from other STAs in addition to an AP. A method of acquiring the criteria information may be a method of overhearing a frame transmitted by the AP to other STAs as well as directly receiving the criteria information which is broadcast or unicast by the AP. Examples of the criterion for determining whether to continue the access include a channel correlation, an access category (AC), a received power level, etc., each of which will be described below in detail together with a method of acquiring the criterion.

The STA determines whether to continue channel access on the basis of the criteria information acquired in step S210 (step S220). In this case, a detailed method used in the determination may vary according to a type of the criteria information, and will be described below together with specific embodiments.

If the STA continues channel access, the STA transmits a transmission request message to the AP (step S240). The transmission request message may be used when the STA reports to the AP that a frame to be transmitted is present or when the AP estimates a channel between the AP and the STA. The transmission request message may be a newly defined management action frame, or may be a sounding physical layer convergence procedure (PLCP) protocol unit (PPDU) or a request to send (RTS) frame based on the IEEE 802.11 standard.

Thereafter, the STA receives a transmission response message from the AP in response to the transmission request message (step S250). The transmission response message may include the criteria information or a result obtained when the AP performs channel estimation by receiving the transmission request message. The transmission response message may be a newly defined management action frame or a clear to send (CTS) frame based on the IEEE 802.11 standard. A third STA accessing a channel afterwards may overhear the transmission response message and determine whether to continue channel access on the basis of the criteria information included in the transmission response message.

Thereafter, the STA performs uplink transmission or downlink reception together with other STAs simultaneously accessing the channel (step S260).

If the determination result of step S220 based on the criteria information shows that it is not proper to continue channel access, the STA defers channel access (step S270).

Hereinafter, a specific example of the criteria information and an SDMA channel access method related thereto will be described in detail.

According to an embodiment of the present invention, a criterion for determining whether an STA will continue channel access may be a channel correlation. In this case, the criteria information is channel state information between an AP and each STA.

STAs, which desire to access a channel in uplink SDMA, attempt channel access according to a channel access method (e.g., a backoff mechanism of enhanced distributed channel access (EDCA)) based on the IEEE 802.11 standard. An STA, of which a backoff timer expires first, transmits a transmission request message to an AP. The AP receives the transmission request message and performs channel estimation. The AP transmits a transmission response message to the STA. In this case, the transmission response message includes channel state information known to the AP in addition to a result of the channel estimation. STAs, which overhear the transmission response message, can determine whether to continue channel access on the basis of the channel state information included in the transmission response message. For example, if the channel state information indicates that a channel correlation is high between an STA which has requested the AP to perform uplink transmission and an STA which attempts channel access, the STA which attempts channel access may defer channel access.

From the perspective of the STA which attempts channel access, the STA which currently attempts channel access acquires the channel state information by overhearing the transmission response message transmitted in response to the transmission request message of the STA which has previously accessed the channel, and determines whether to access the channel on the basis of the channel state information. The channel state information included in the transmission response message may be utilized as information for decreasing a channel correlation among STAs simultaneously participating in uplink transmission.

Figure 3:
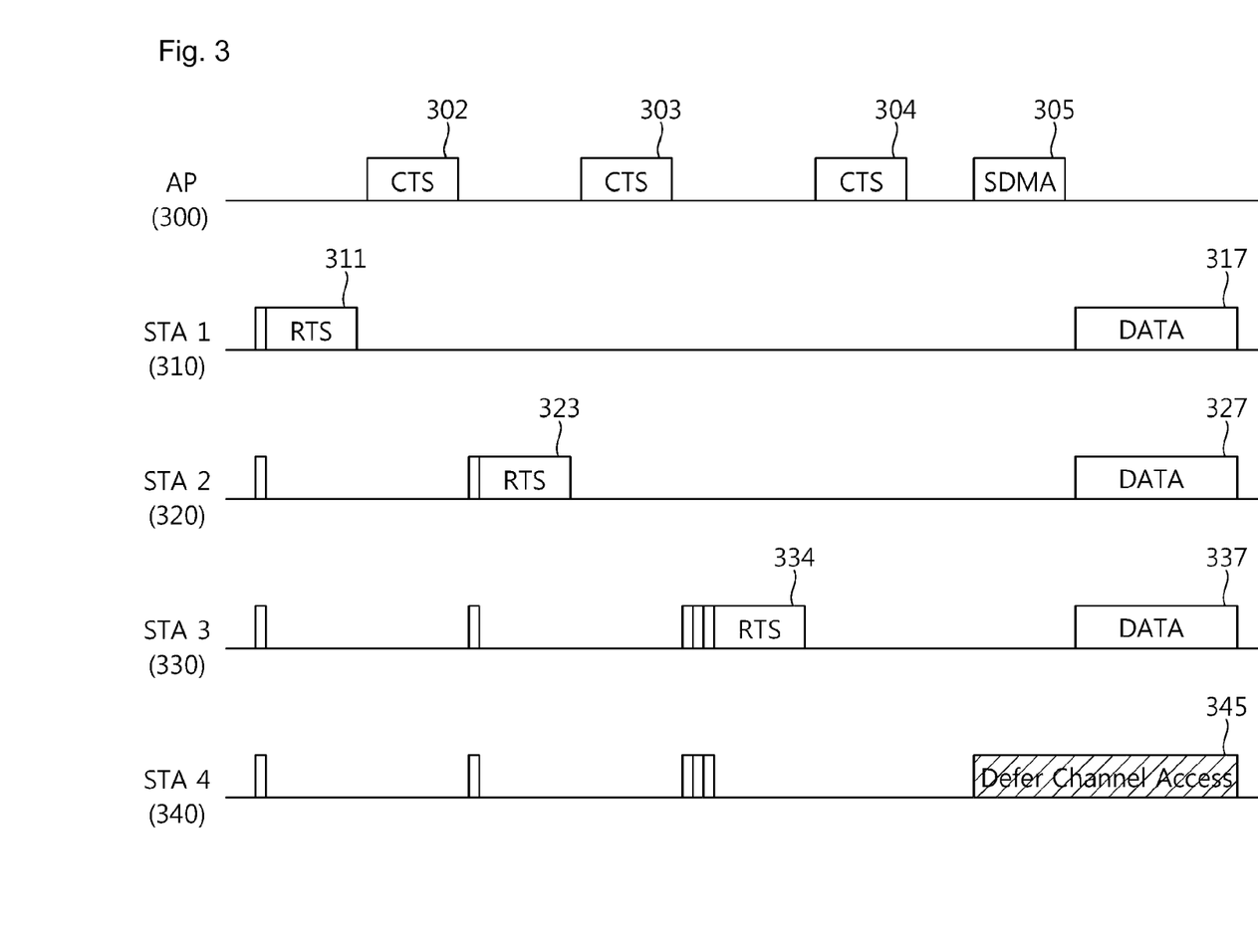
FIG. 3 shows an example of a space division multiple access (SDMA) channel access method according to an embodiment of the present invention.

FIG. 3 shows an example of an SDMA channel access method according to an embodiment of the present invention.

In the example of FIG. 3, an STA1 310, an STA2 320, an STA3 330, and an STA4 340 perform uplink transmission to an AP 300. It is shown in the example of FIG. 3 that four STAs simultaneously attempt channel access, and use an RTS frame as a transmission request message and a CTS frame as a transmission response message. However, this is for one exemplary embodiment of the present invention only, and thus the number of STAs attempting channel access is not limited to that exemplified in FIG. 3. In addition, the transmission request message is not constrained to the RTS frame, and the transmission response message is not constrained to the CTS frame. As described above, the RTS frame of FIG. 3 may be a newly defined frame or a sounding PPDU and the CTS frame may be a newly defined frame, and the same will be true hereinafter.

The STA1 310, the STA2 320, the STA3 330, and the STA4 340 attempt channel access in order to participate in uplink transmission. A backoff timer of the STA 310 expires first, and the STA 310 transmits an RTS frame 311 to the AP 300. The AP 300 receives the RTS frame 311, and based on this, performs channel estimation with respect to the STA1 310. The AP 300 transmits a CTS frame 302 as a response. In this case, the CTS frame 302 includes not only a channel estimation result but also channel state information of STAs known to the AP 300. The STA2 320, the STA3 330, and the STA4 340 overhear the CTS frame 302, and determine whether to continue channel access on the basis of the channel state information included in the CTS frame 302.

Thereafter, backoff timers of the STA2 320 and the STA3 330 expire, and the STA2 320 and the STA3 330 transmit an RTS frame 323 and an RTS frame 334, and the AP 300 transmits a CTS frame 303 and a CTS frame 304 in response thereto. The CTS frame 303 may further include a channel estimation result with respect to the STA2 320. The CTS frame 304 may further include a channel estimation result with respect to the STA3 330. In the example of FIG. 3, the STA2 320 has a channel correlation having a specific level or lower with respect to the STA1 310 which first accesses a channel on the basis of the channel state information acquired from the CTS frame 302. The STA2 320 participates in uplink SDMA transmission by accessing the channel. Similarly, the STA3 330 has a channel correlation having a specific level or lower with respect to the STA1 310 and STA2 320 which first access a channel on the basis of the channel state information acquired from the CTS frame 302 or the CTS frame 303. The STA3 330 participates in uplink SDMA transmission by accessing the channel.

Unlike the STA2 320 and the STA3 330, the STA4 340 has a high channel correlation with respect to at least one of the STA1 310, the STA2 320, and the STA3 330 on the basis of the channel state information acquired by overhearing the CTS frame 304. The STA4 340 defers channel access. As an example of deferring channel access, the STA4 340 may configure a network allocation vector (NAV).

The SDMA method according to the embodiment of the present invention can also be applied to downlink transmission.

In downlink SDMA, an AP broadcasts a target indication message. The target indication message includes information on a target STA of a frame stored in a buffer of the AP and to be transmitted in downlink. As an example, the target indication message may include a MAC address list of the target STA. Upon receiving the target indication message, STAs determine whether they are target STAs. Similarly to the aforementioned uplink transmission, the target STA performs a channel estimation process by exchanging a transmission request message and a transmission response message. In this case, the transmission request message may include a result of channel estimation performed by the STA by receiving the target indication message.

The transmission request message/transmission response message can be exchanged between the target STAs and the AP according to an order designated by the AP. For this, the AP may transmit backoff timer configuration information of the STA. The STA may sequentially exchange the transmission request message/transmission response message with the AP by configuring a backoff timer according to the backoff timer configuration information of the STA. As an example, if an STA_A, an STA_B, and an STA_C are target STAs, the AP transmits values of 1, 2, and 3 respectively to the STA_A, the STA_B, and the STA_C as the backoff timer configuration information. Upon receiving the backoff timer configuration information, the STA_A, the STA_B, and the STA_C may respectively set their backoff timers to 1, 2, and 3 so that the transmission request message/transmission response message are exchanged in sequence.

As another example, a backoff mechanism may be used to exchange the transmission request message/transmission response message. In a case where the STA_A, the STA_B, and the STA_C decrease their backoff timers in order to perform channel access, if the backoff timer of the STA_A expires first and the exchange of the transmission request message/transmission response message starts, the STA_B and the STA_C do not reconfigure their backoff timers but maintain the backoff timers configured when the STA_A starts the exchange of the transmission request message/ transmission response message, and decrease the backoff timers after the STA_A exchanges the transmission request message/transmission response message.

Similarly to the aforementioned uplink SDMA, the transmission response message may include channel state information. One STA knows a channel correlation with respect to another STA which accesses a channel prior to the STA itself on the basis of the channel state information, and accordingly may defer or continue channel access.

Figure 4:
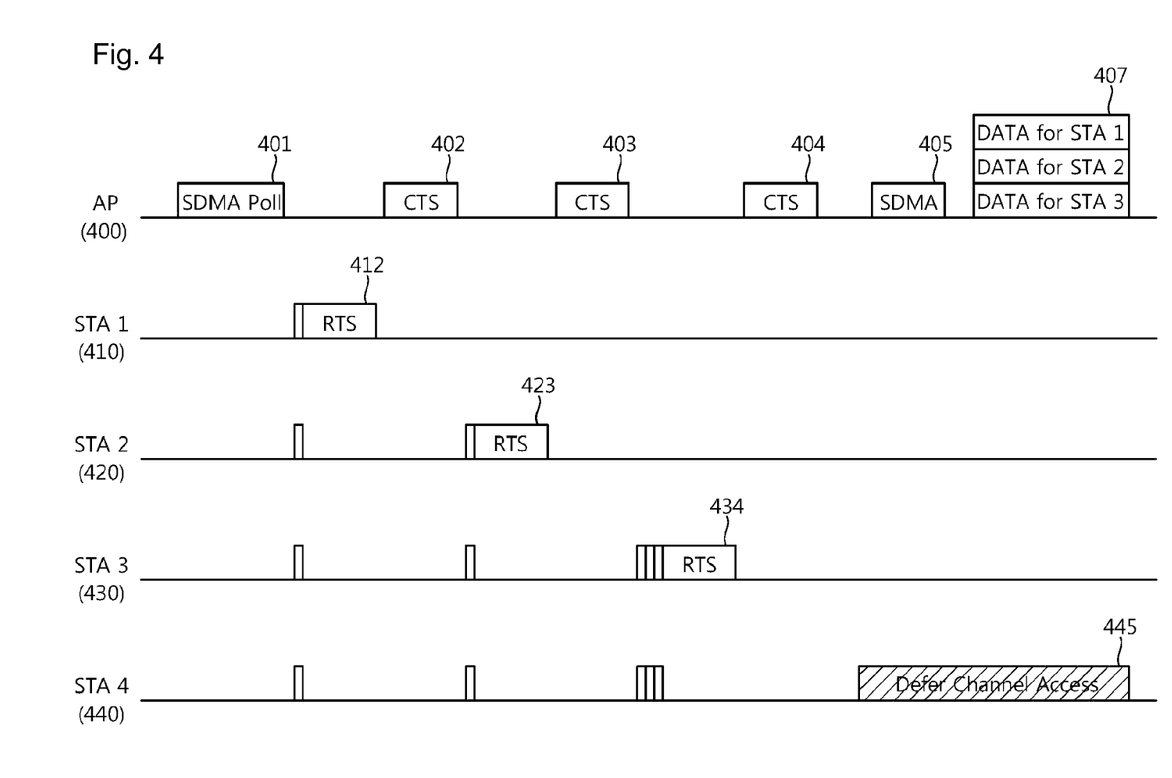
FIG. 4 shows an example of an SDMA method applicable to downlink transmission according to the present invention.

FIG. 4 shows an example of an SDMA method applicable to downlink transmission according to the present invention.

An AP 400 broadcasts an SDMA poll frame 401 as a target indication message. The SDMA poll frame 401 includes a list of target STAs for receiving SDMA data 407 to be transmitted in a downlink. In the example of FIG. 4, the SDMA poll frame 401 includes information indicating an STA1 410, an STA2 420, an STA3 430, and an STA4 440, and may be MAC addresses of the STA1 410, the STA2 420, the STA3 430, and the STA4 440. Upon receiving the SDMA poll frame 401, the STA1 410, the STA2 420, the STA3 430, and the STA4 440 exchange RTS/CTS frames with the AP 400. The RTS frame is an example of a transmission request message, and the CTS frame is an example of a transmission response message. The RTS/CTS frames may be exchanged between the AP 400 and the STAs (i.e., the STA1 410, the STA2 420, the STA3 430, and the STA4 440) on the basis of backoff timer configuration information transmitted by the AP 400 as described above, or may be exchanged according to a backoff timer expiry order determined by random backoff.

The STA4 440 overhears a CTS frame 403 to acquire channel state information included in the CTS frame 403, and thus can determine whether to continue channel access. In the example of FIG. 4, the STA4 440 has a high channel correlation with respect to at least one STA among the STA1 410, the STA2 420, and the STA3 430. In this case, the STA4 440 defers channel access.

Regarding the STA1 410, the STA2 420, and the STA3 430 having a low channel correlation, the AP 400 transmits the spatially multiplexed data 407 to the STA1 410, the STA2 420, and the STA3 430. As such, SDMA transmission can be simultaneously performed on a group of STAs having a low channel correlation, and thus usage of radio resources can be optimized.

Figure 5:
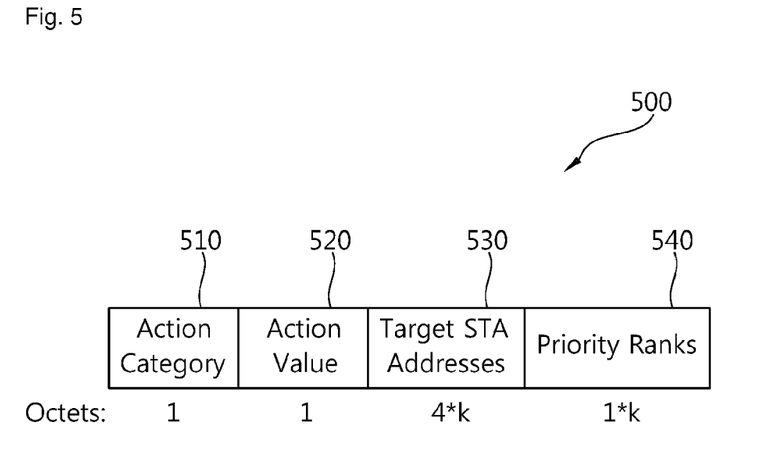
FIG. 5 is a block diagram showing an exemplary format of a target indication message according to an embodiment of the present invention.

FIG. 5 shows an exemplary format of a target indication message according to an embodiment of the present invention.

A target indication message 500 includes an action category field 510, an action value field 520, and a target STA address field 530.

The action category field 510 and the action value field 520 briefly indicate an operational description and a category of a specific frame. That is, the specific frame is related to indication of a target STA, and whether to include additional information containing a list of target STAs can be indicated.

The target STA address field 530 includes identification information of target STAs. The identification information of the target STAs may be MAC addresses or AIDs of the target STAs.

The target indication message 500 may further include a priority rank field 540. The priority rank field may include information for designating an order when respective target STAs exchange a transmission request message/transmission response message with an AP. As an example, backoff timer configuration information of each target STA may be included. Each target STA may configure its backoff timer on the basis of the backoff timer configuration information, and may exchange the transmission request message/transmission response message with the AP according to a backoff timer expiry order. That is, an STA having a priority rank of 0 may set its backoff timer to 0 and an STA having a priority rank of 4 may set its backoff timer to 4, and then an order of exchanging the transmission request message/transmission response message may be determined between the STAs.

According to another embodiment of the present invention, criteria information may be an access category (AC). The AC may be information indicating a category of a frame to be transmitted or information indicating a transmission priority. The AC may be included in an EDCA parameter set, and may be used as a label for indicating a transmission priority or a data type of a frame including the EDCA parameter set.

TABLE 1

| Value | AC | Description |
| --- | --- | --- |
| 00 | AC_BE | Best effort |
| 01 | AC_BK | Background |
| 10 | AC_VI | Video |
| 11 | AC_VO | Voice |

Table 1 shows an example of the AC. In addition to AC_BE, AC_BK, AC_VI, and AC_VO of Table 1, another AC type may be added or some of the AC types may be omitted according to a configuration.

When the AC is used as the criteria information, an AP may transmit a transmission response frame by inserting AC information into the transmission response frame so that only STAs having traffic of a specific AC are allowed for access. Alternatively, an STA may insert AC information of uplink traffic desired to be transmitted by the STA to a transmission request frame to be transmitted to the AP. The AP acquires the AC information from the received transmission request frame, and retransmits the transmission request message by inserting the AC information into the transmission response message.

Referring back to the example of FIG. 3, the STA1 310 transmits the RTS frame 311 by inserting AC information of traffic to be transmitted by the STA1 310 into the RTS frame 311. The AP 300 piggybacks the AC information included in the RTS frame 311 to the CTS frame 302. The STA2 320, the STA3 330, and the STA4 340 determine whether to continue channel access on the basis of the AC information of the CTS frame 302.

If the AP 300 sets an AC to AC_VI in the CTS frame 302, an STA having traffic corresponding to AC_BE, AC_BK, and AC_VO other than AC_VI defers channel access. Accordingly, only STAs having traffic corresponding to AC_VI can participate in uplink transmission by transmitting RTS frames.

According to another embodiment of the present invention, the criteria information may be a received power level. A channel state or a distance between the AP and each STA may be different, and thus received power levels of uplink transmission frames simultaneously received by the AP from STAs participating in uplink transmission may be different from one another. To increase a performance gain of uplink SDMA transmission, received power levels of respective STAs' transmission frames received by the AP need to be set to similar values. Respective STAs' transmit power may be regulated so that the received power levels of the respective STAs' transmission frames received by the AP are set to similar values, but in this case, if a specific STA decreases its transmit power for this reason, there is a problem in that a modulation and coding scheme (MCS) also has to be selected to a low level. Therefore, there is a need for a method in which an STA does not decrease it's transmit power and an AP simultaneously receives traffic having a similar received power level.

This problem can be solved according to the embodiment of the present invention in which the received power level is used as the criteria information. By using the received power level of the AP as a criterion for determining whether the STA will continue channel access, the AP can participate in uplink transmission by accessing a channel for each group by grouping STAs having the similar received power level (i.e., only STAs having the similar received power level simultaneously access the channel).

Referring back to the example FIG. 3, the AP 300 transmits a CTS frame including an accessible target received power level. The target received power level may be set to a range of a received power level at which the AP will allow access. The range of the received power level at which the AP will allow access may be set on the basis of a received power level measured by receiving the RTS frame 311 from the STAT 310. Upon overhearing the CTS frame, the STA2 320, the STA3 330, and the STA4 340 determine whether a received power level for the CTS frame is within a received power level range (MIN, MAX) included in the CTS frame, and if the determination result is affirmative, continues channel access, and otherwise, differs channel access.

Although the channel correlation, the access category, and the received power level are taken as an example of the criterion for determining whether the STA will continue channel access in the aforementioned description, various criteria may be included in the criteria information according to a configuration. The various criteria for determining whether the STA will continue channel access may be combined and used together.

Figure 6:
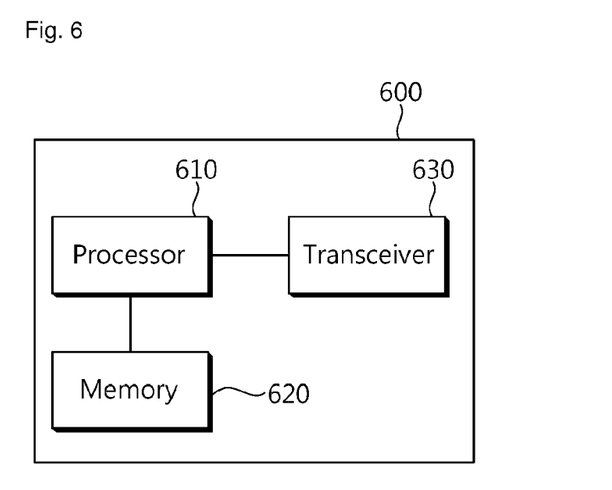
FIG. 6 is a block diagram showing a wireless apparatus for implementing an embodiment of the present invention.

FIG. 6 is a block diagram showing a wireless apparatus for implementing an embodiment of the present invention. A wireless apparatus 600 may be an AP or an STA.

The wireless apparatus 600 includes a processor 610, a memory 620, and a transceiver 630. The transceiver 630 may have a plurality of network interface cards (NICs), and may transmit/receive a frame through a plurality of antennas by using an SDMA method. The processor 610 is coupled to the transceiver 630 and performs SDMA based on the method proposed in the present invention. Further, the processor 610 generates a frame for the SDMA and processes a received frame. The processor 610 and the transceiver 630 implement a physical layer and a MAC layer of IEEE 802.11. The processor 610 and/or the transceiver 630 may include an application-specific integrated circuit (ASIC), a separate chipset, a logic circuit, and/or a data processing unit. The memory 620 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 620 and may be performed by the processor 610. The memory 620 may be located inside or outside the processor 610, and may be coupled to the processor 610 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A method for performing channel access in a wireless local area network, the method comprising:
    transmitting, by an initiating station to an access point, a request message for requesting a channel access, the request message including information about a first access category indicating a quality of service for an uplink traffic that the initiating station wants to send; and
    receiving, by the initiating station from the access point, a response message as a response to the request message, the response message including information about a second access category indicating a quality of service for uplink traffics that are to be sent by a set of stations.

2. The method of claim 1, wherein the request message includes a request-to-send (RTS) frame and the response message includes a clear-to-send (CTS) frame.

3. A device for use in a wireless local area network, the device comprising:
    a transceiver configured to transmit and receive radio signals; and
    a processor operatively coupled with the transceiver and configured to instruct the transceiver to:
        transmit a request message for requesting a channel access to an access point, the request message including information about a first access category indicating a quality of service for an uplink traffic that the device wants to send;
        receive a response message as a response to the request message from the access point, the response message including information about a second access category indicating a quality of service for uplink traffics that are to be sent by a set of stations.

4. The method of claim 1, wherein the response message is broadcast by the access point.

5. The method of claim 1, wherein the initiating station belongs to the set of stations.

6. The method of claim 1, wherein the set of stations accesses a channel for uplink transmission based on the second access category.

* * * * *